US006654345B1

United States Patent
Chiussi et al.

(10) Patent No.: US 6,654,345 B1
(45) Date of Patent: Nov. 25, 2003

(54) SINGLE-BIT TIMESTAMPS FOR DATA TRANSFER RATE AND DELAY GUARANTEES IN A PACKET NETWORK

(75) Inventors: Fabio M. Chiussi, Long Branch, NJ (US); Andrea Francini, Eatontown, NJ (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/432,976

(22) Filed: Nov. 3, 1999

Related U.S. Application Data

(60) Provisional application No. 60/107,096, filed on Nov. 5, 1998.

(51) Int. Cl.[7] .......................... H04L 12/54; H04L 12/56
(52) U.S. Cl. ...................... 370/231; 370/232; 370/235; 370/413
(58) Field of Search ................................ 370/230, 231, 370/232, 234, 235, 389, 391, 392, 395, 412, 413

(56) References Cited

U.S. PATENT DOCUMENTS

| | | | |
|---|---|---|---|
| 5,649,110 A | * 7/1997 | Ben-Nun et al. | 370/351 |
| 5,724,513 A | * 3/1998 | Ben-Nun et al. | 709/234 |
| 5,978,356 A | 11/1999 | Elwalid et al. | |
| 6,028,843 A | * 2/2000 | Delp et al. | 370/235 |
| 6,088,734 A | 7/2000 | Marin et al. | |
| 6,134,217 A | * 10/2000 | Stiliadis et al. | 370/232 |

OTHER PUBLICATIONS

"Hierarchical Packet Fair Queueing Algorithms" by Jon C. R. Bennett and Hui Zhang, FORE Systems Inc., Carnegie Mellon University (14 pages).

(List continued on next page.)

Primary Examiner—Alpus H. Hsu
Assistant Examiner—Robert Stevens
(74) Attorney, Agent, or Firm—Steve Mendelsohn; Ian M. Hughes

(57) ABSTRACT

Single-bit-timestamp discrete-rate scheduling distributes service to competing connections (e.g., packet connections such as virtual-circuit connections) using a single bit for each connection, rather than using one or more multi-bit timestamps per connection. Single-bit timestamps are computed and sorted for scheduling packets in, for example, Asynchronous Transfer Mode (ATM) networks, for guaranteeing data transfer rates to data sources and data transfer delays from data sources to destinations. Connections are listed in one of N first-in, first-out (FIFO) rate queues j, each rate queue j, $1 \leq j \leq N$, associated with one of N service rates. A scheduler identifies the next connection for service as the connection $VC_{j,i}$ being at the head of the rate queue with the minimum corresponding timestamp among those rate queues having timestamps satisfying an eligibility condition. Single-bit-timestamp discrete-rate scheduling uses a multi-bit timestamp value $F_j$ (referred to as the queue timestamp), one bit $bQ_j$ (referred to as the queue bit) per rate queue j, and a single bit $bVC_{j,i}$ (referred to as the connection bit) for the ith connection $VC_{j,i}$ in rate queue j. The scheduler generates and maintains queue timestamps $F_j$, queue bits $bQ_j$, and connection bits $bVC_{j,i}$ based on whether the rate queues and the connections are backlogged. At timeslot m, the scheduler searches for the queue timestamp $F_{S(m)}$ having the minimum value among the rate queue timestamps associated with currently backlogged rate queues (a FIFO rate queue j is backlogged when the list has at least one connection in the rate queue) and satisfies the eligibility condition according to a selection policy. Single-bit-timestamp discrete-rate scheduling uses only a single bit for each queued connection, and achieves delay bounds and fairness indices that are identical to those of a prior art discrete-rate scheduler using per-connection multi-bit timestamps.

21 Claims, 8 Drawing Sheets

OTHER PUBLICATIONS

"A General Methodology for Designing Efficient Traffic Scheduling and Shaping Algorithms" by Dimitrios Stiliadis and Anujan Varma, Bell Laboratories, Lucent Technologies, Computer Enginerring, University of California (10 pages).

"High Speed, Scalable, and Accurate Implementation of Packet Fair Queueing Algorithms in ATM Networks" by Jon C. R. Bennett, Donpaul C. Stephens and Hui Zhang, FORE Systems, Carnegie Mellon University (8 pages).

"Implementing Fair Queueing in ATM Switches: The Discrete–Rate Approach" by Fabio M. Chiussi and Andrea Francini, High–Speed Networks Research Department, Bell Laboratories, Lucent Technologies (10 pages).

"VirtualClock: A New Traffic Control Algorithm for Packet–Switched Networks" by Lixia Zhang, ACM Transactions on Computer Systems, vol. 9, No. 2, May 1991, pps. 101–124.

"A Generalized Processor Sharing Approach to Flow Control in Integrated Services Networks: The Single–Node Case" by Abhay K. Parekh and Robert G. Gallager, IEEE/ACM Transactions on Networking, vol. 1, No. 3, Jun. 1993, pps. 344–357.

"A Self–Clocked Fair Queueing Scheme for Broadband Applications" by S. Jamaloddin Golestani, 1994 IEEE, pps. 636–646.

"Efficient Fair–Queueing Algorithms for ATM and Packet Networks" by Dimitrios Stiliadis and Anujan Varma, UCSC– CRL–95–59, Dec. 1995, pps. 1–24, Appendix A (4 pages), Appendix B (7 pages).

"Design and Analysis of Frame–based Fair Queueing: A New Traffic Scheduling Algorithm for Packet–Switched Networks" by Dimitrios Stiliadis and Anujan Varma; SIGMETRICS 96–5/96 Philadelphia, 1996 (12 pages).

"WF$^2$Q: Worst–case Fair Weighted Fair Queueing" by Jon C. R. Bennett and Hui Zhang, FORE Systems, School of Computer Science, Carnegie Mellon University (9 pages).

* cited by examiner

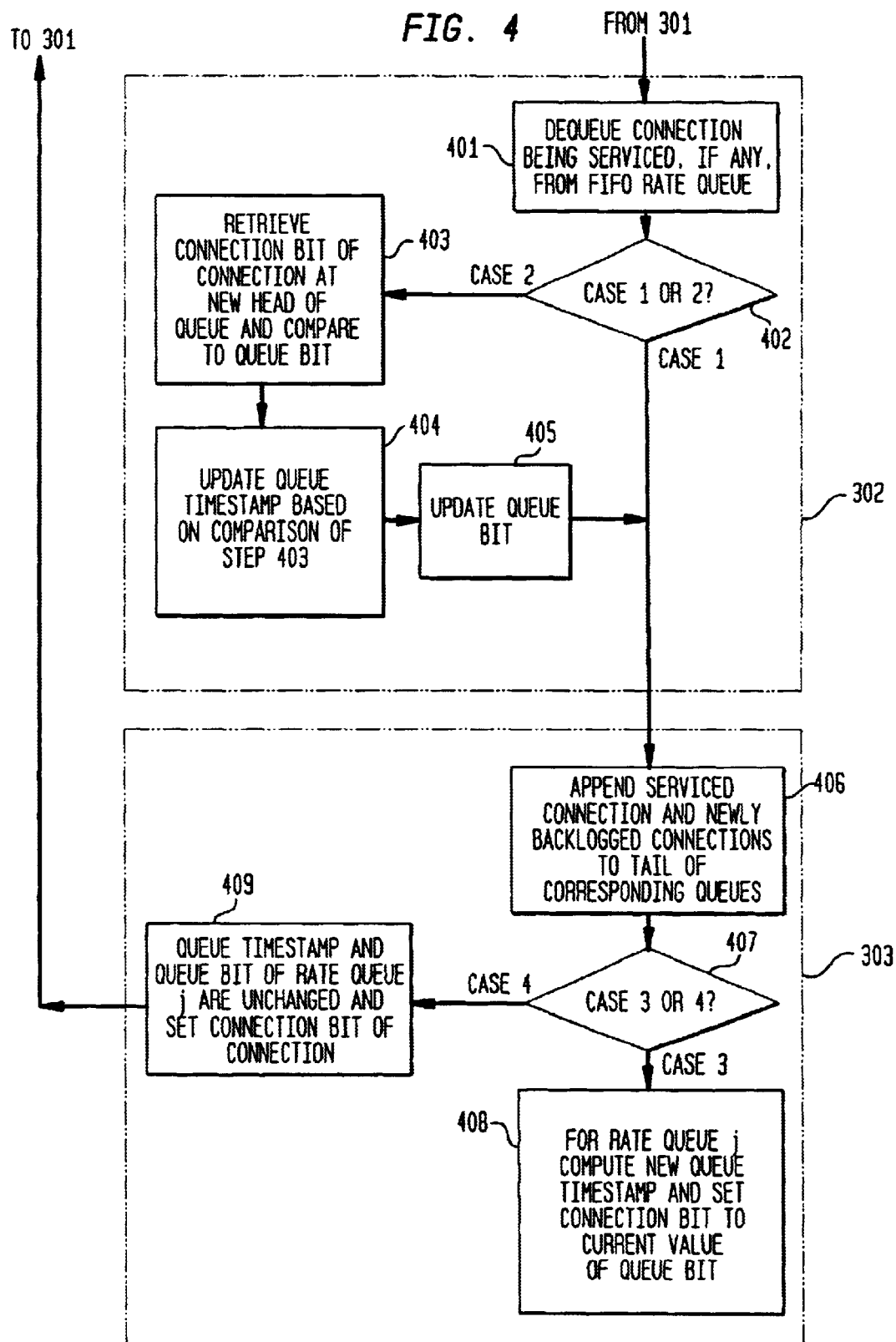

US 6,654,345 B1

SINGLE-BIT TIMESTAMPS FOR DATA TRANSFER RATE AND DELAY GUARANTEES IN A PACKET NETWORK

CROSS-REFERENCE TO RELATED APPLICATIONS

This application claims the benefit of the filing date of U.S. provisional application No. 60/107,096, filed on Nov. 5, 1998.

BACKGROUND OF THE INVENTION

1. Field of the Invention

The present invention relates to routing packets in a communication network, and, more particularly, to scheduling routing of packets through nodes of the network to guarantee a data transfer rates and delay bounds between data sources and destinations.

2. Description of the Related Art

Packet networks, such as asynchronous transfer mode (ATM) networks, commonly schedule processing and forwarding of data packets (or "cells" in ATM networks) received at each intermediate node. Such scheduling may be employed to reduce or prevent excessive delay experienced by packets of each user's data connection, termed a virtual circuit connection (VC-connection), as the packets are routed through the node. Scheduling allows network providers to guarantee data transfer rates and bounds for delay through the node and the network. Network providers may then offer these rates and bounds for the VC-connections as a guaranteed service. Minimizing implementation costs for a per-virtual-circuit connection (per VC-connection) scheduling algorithm is a performance objective for designers of packet networks. Such algorithms for scheduling packets may achieve excellent delay and fairness properties by approximating an ideal scheduling discipline, known as a Generalized Processor Sharing (GPS) scheduling algorithm. One exemplary GPS scheduling algorithm is described in A. K. Parekh and R. G. Gallagher, "A Generalized Processor Sharing Approach to Flow Control in Integrated Services Networks: The Single-Node Case," *IEEE/ACM Trans. Networking*, pp. 344–357, June 1993 (hereinafter "Parekh").

Among GPS scheduling algorithms used by a scheduler of the node, the class of packet-by-packet rate-proportional servers (P-RPS) is known in the art for near optimal delay properties. The schedulers of this class compute, for each packet, or group of packets, queued in the node, a "timestamp" value (the timestamp is also known as the "virtual finishing time"). The timestamp specifies when the packet(s) should be routed (transmitted) relative to packet(s) of the other VC-connections in the node. Several such P-RPS scheduling algorithms well-known in the art are: Packet-by-packet Generalized Processor Sharing (P-GPS), Virtual Clock, Frame-based Fair Queuing (FFQ), Self-Clocked Fair Queuing (SCFQ), and Starting-Potential Fair Queuing (SPFQ). These algorithms differ in the specific measure or function used as the system potential (predefined service time reference that may be calculated on an ongoing basis) to compute the timestamps. These algorithms are described in, for example, Parekh; D. Stiliadis and A. Varma, "Design and Analysis of Frame-based Fair Queuing: A New Traffic Scheduling Algorithm for Packet-Switched Networks," *Proc. SIGMETRICS '96*, pp. 104–115, May 1996; L. Zhang, "Virtual Clock A New Traffic Control Algorithm for Packet Switching," *ACM Trans. Comp. Syst.*, pp.101–124, May 1991; D. Stiliadis and A.Varma, "Efficient Fair Queuing Algorithms for ATM and Packet Networks," *Tech. Rep.* UCSC-CRL-95-59, December 1995; and S. J. Golestani, "A Self-Clocked Fair Queuing Scheme for Broadband Applications," *Proc. INFOCOM '94*, pp. 636–646, April 1994 (hereinafter "Golestani").

In addition to delay properties, another measure of scheduling algorithm performance is the "fairness" of the scheduling discipline. Fairness is generally used to characterize the priority or distribution of delay that the scheduler assigns to servicing packet(s) of each connection in the queues when the node is backlogged (i.e., when the queues are not empty while servicing or completing service of a connection). Two measures of fairness are commonly employed in the art. The first fairness measure is the service fairness index (SFI, described in Golestani) that measures the distance (as mathematically defined, such as the Euclidean distance) of the particular scheduling discipline from the ideal fairness of GPS in distributing service to VC-connections that are simultaneously backlogged.

The second fairness measure is the worst-case fairness index (WFI) that measures the maximum amount of time that packets of a backlogged VC-connection may have to wait between two consecutive services (e.g., processing and routing of two separately received groups of packets). WFI is described in J. C. R. Bennett and H. Zhang, "WF$^2$Q: Worst-case Fair Weighted Fair Queueing," *Proc. INFOCOM '96*, pp. 120–128, March, 1996. Schedulers with minimal WFI are known in the art as worst-case-fair schedulers and are desirable, since the distribution of service to competing connections in a scheduler with small WFI is much less bursty than in a scheduler with a large WFI.

A P-RPS worst-case fair scheduler may employ "smallest eligible virtual finishing time first" (SEFF) packet-selection. With SEFF, the scheduler grants the next service to the packet of a VC-connection having the minimum timestamp among those packets satisfying an "eligibility condition." The eligibility condition may be that the packet of a VC-connection have a starting potential (or virtual starting time) that is not greater than the current value of system potential. For each VC-connection, the eligibility condition needs to be verified only for the packet at the head of the corresponding queue, since this is the packet with the minimum starting potential among all packets in that queue. Depending on the specific P-RPS algorithm employed, the scheduler with SEFF selection may be work-conserving (e.g., P-GPS and SPFQ algorithms) or non-work-conserving (e.g., Virtual Clock and FFQ algorithms). A P-RPS scheduler employing SEFF selection may have optimal delay bounds, be worst-case fair, and have an SFI close to the theoretical lower bound in packet-by-packet servers. SEFF selection is described in J. C. R. Bennett and H. Zhang, "Hierarchical Packet Fair Queueing Algorithms," *Proc. SIGCOMM '96*, pp. 143–156, August 1996; and D. Stiliadis and A. Varma, "A General Methodology for Designing Efficient Traffic Scheduling and Shaping Algorithms," *Proc. INFOCOM '97*, April 1997.

Four factors contribute to a total implementation cost for a P-RPS worst-case fair scheduler. The first factor is the complexity of calculating or maintaining the system potential, which factor is generally specific to the particular scheduling algorithm (e.g., for a scheduler supporting V VC-connections, this complexity is O(V) for the P-GPS algorithm, O(logV) for the SPFQ algorithm, and O(1) in Virtual Clock and FFQ algorithms, where O(*) is the mathematical relation "on the order of *") The other three factors, common to all P-RPS worst-case fair schedulers, are: (i) the complexity of identifying the eligible packets, (ii) the cost of handling and storing the timestamps, and (iii) the complexity of sorting the timestamps of the eligible packets in order to select the one with minimum timestamp for the next service. The complexity of implementing SEFF is a considerable burden when the scheduler's implementation is based on conventional priority queues, since a worst-case of O(V) packets may become eligible for service at the same time.

Discrete-rate scheduling may be used instead of conventional priority queues when the scheduler is only required to support a relatively small discrete set of guaranteed service rates at any time. In the discrete-rate scheduler, backlogged VC-connections with the same service rate are grouped together in a First-In-First-Out (FIFO) rate queue, and only packets for VC-connections at the head of each FIFO rate queue are scheduled for service. Thus, the number of VC-connections for which the eligibility condition must be determined and the number of corresponding timestamps to be sorted are significantly reduced (equal to the number of supported service rates). Consequently, the complexity of implementing the SEFF policy is considerably decreased. In the case of P-RPS worst-case fair schedulers, discrete-rate scheduling yields negligible degradation in delay bounds when compared to conventional priority queues, and conserves both the minimal WFI and the excellent SFI of conventional priority queues.

While discrete-rate scheduling reduces implementation complexity of P-RPS worst-case fair schedulers, discrete-rate scheduling still requires computing and storing a timestamp for each connection, which is a significant contribution to the implementation cost of the scheduler. This method of prior art discrete-rate scheduling is referred to herein as "discrete-rate scheduling with per-connection timestamps". Such discrete-rate scheduling technique is described in J. C. R. Bennett, D. C. Stephens, and H. Zhang, "High Speed, Scaleable, and Accurate Implementation of Fair Queuing Algorithms in ATM Networks," *Proc. ICNP '97*, pp. 7–14, October 1997. To further reduce implementation complexity, a discrete-rate scheduler may not compute and store a timestamp for each connection, but maintains a single timestamp per service rate. While this method of discrete-rate scheduling without per-connection timestamps achieves near-optimal delay bounds, the service fairness index is significantly compromised. Such scheduling is described in F. M. Chiussi and A. Francini, "Implementing Fair Queueing in ATM Switches: The Discrete-Rate Approach," *Proc. INFOCOM '98*, pp. 272–281, March 1998.

SUMMARY OF THE INVENTION

In accordance with the present invention, single-bit-timestamp discrete-rate scheduling distributes service to competing connections (e.g., packet connections such as virtual-circuit connections) using a single bit per connection, rather than using a multi-bit timestamp for each connection. One of a plurality of connections received by a server in a packet network is selected for service and updated in the following manner. Each connection is assigned to a corresponding rate queue based on a service rate of the connection, each rate queue having a corresponding queue timestamp and a queue bit. Each connection is assigned a connection bit. The connection, if any, at a head of a rate queue is selected for service based on the queue timestamp of the rate queue, the queue timestamp satisfying a predetermined criterion. The connection is dequeued by i) removing the connection selected for service from the corresponding rate queue, and by ii) updating at least one of the corresponding queue timestamp, queue bit, and connection bit of the connection. The connection is enqueued by i) appending the connection to the tail of the corresponding rate queue, and ii) updating at least one of the corresponding queue timestamp, queue bit, and connection bit of the connection. Single-bit timestamp discrete-rate scheduling may achieve the same delay bounds and fairness indices of the discrete-rate scheduling using a multi-bit timestamp for each connection, and may allow a network provider to guarantee data transfer rates and delay bounds between data sources and destinations.

BRIEF DESCRIPTION OF THE DRAWINGS

Other aspects, features, and advantages of the present invention will become more fully apparent from the following detailed description, the appended claims, and the accompanying drawings in which:

FIG. 4 shows an exemplary implementation of VC-enqueue and VC-dequeue steps for the method of FIG. 3;

DETAILED DESCRIPTION

Figure 1:
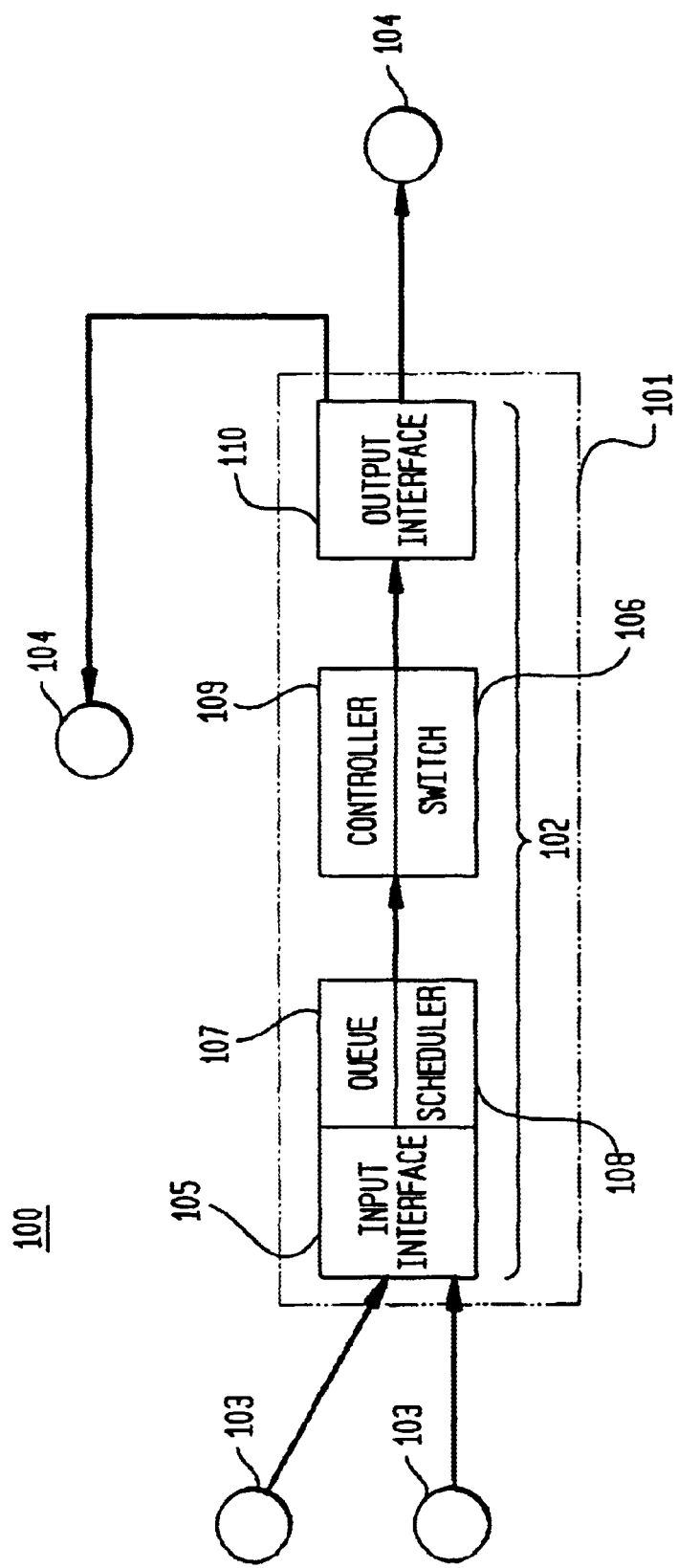
FIG. 1 shows a server of a node in a packet network employing single-bit-timestamp discrete-rate scheduling in accordance with certain embodiments of the present invention.

FIG. 1 shows a node 101 of a packet network 100, such as an asynchronous transfer mode network, having a server 102 employing single-bit-timestamp discrete-rate scheduling in accordance with exemplary embodiments of the present invention. As shown in FIG. 1, server 102 includes an input interface 105 that receives packets, or ATM cells, of user data at one or more input ports for connections (e.g., VC-connections) between one or more other source nodes 103 and destination nodes 104. Packets from the input interface 105 are provided to queue 107, and scheduler 108 provides, in accordance with single-bit-timestamp discrete-rate scheduling described subsequently, packets from queue 107 to controller 109 for service and switch 106 for routing. Controller 109 determines routing for the packets (e.g., an output port defined by a routing table for the destination node 104) and causes switch 106 to route the packet to one or more output ports of output interface 110. Although shown as a separate controller 109 and switch 106, one skilled in the art would realize that both controller 109 and switch 106 may be realized within a single device depending on the particular implementation for a routing switch fabric.

Each connection may have a predefined service rate (i.e., a minimum rate at which packets of the connection are desirably processed and routed by server 102). Server 102 may have a bound for the transfer delay added by routing of packets of the connection through the node 101 such as may be desired, for example, to guarantee service rates and maximum transfer delays. The bound for the transfer delay may be related to the service time provided by server 102 (e.g., the processing time to determine the next destination and corresponding output port of output interface 110 and route the connection's packets through the switch 106 to that port). The bound for the transfer delay may also be related to the length and utilization of the queue 107, and the worst-case performance of the scheduling algorithm of scheduler 108 that implements the desired level or index of fairness when processing packets in queue 107.

While FIG. 1 shows a single scheduler 108, other servers may employ several schedulers. For example, a server in an ATM network may employ a scheduler with single-bit-timestamp discrete-rate scheduling for queues at the input interface, at the switch, and at the output interface. As would be apparent to one skilled in the art, the present invention may be employed anywhere in a packet node where packets are queued and selected for processing.

Figure 2:
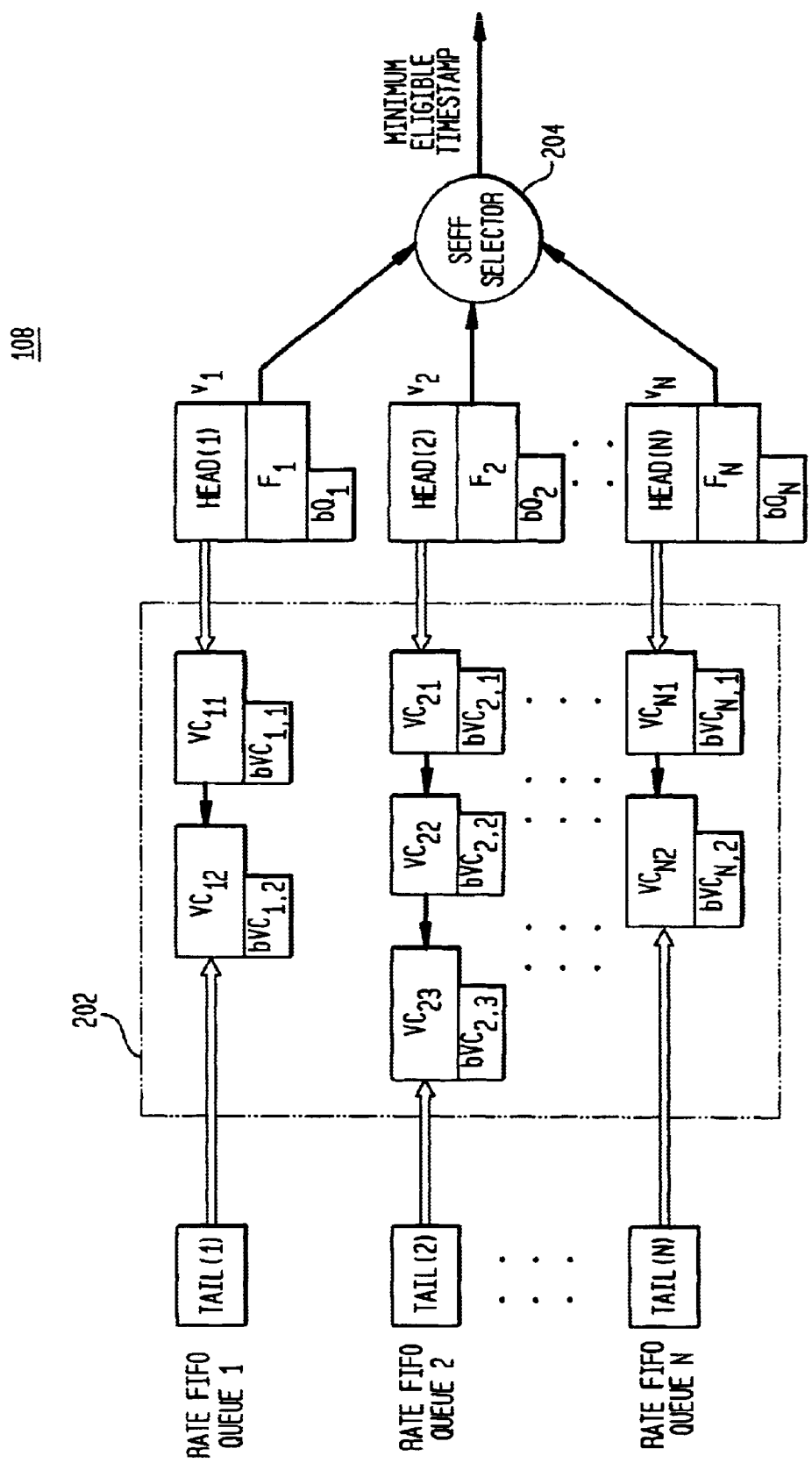
FIG. 2 shows an exemplary implementation of a scheduler for the server of FIG. 1.

FIG. 2 shows an exemplary implementation of a scheduler 108 for the server 102 of FIG. 1 in accordance with the present invention. The server 102 supports a fixed number N of service rates (e.g., guaranteed service rates) associated with packets of connections in queue 107 at any given time. A first-in, first-out (FIFO) rate queue j is associated with each service rate ($1 \leq j \leq N$, N a positive integer), and each connection is associated with a corresponding first-in, first-out (FIFO) rate queue j based on the service rate of the connection. When backlogged, connections with the same service rate $r_j$ are queued in the same rate queue j. Rather than operating directly on the packets stored in queue 107, lists may be constructed by scheduler 108 with entries of each list associated with the connections having packets stored in queue 107. Packets for a connection are then serviced in order when the connection is scheduled for service. Each rate queue j is implemented as a linked list of a set of N lists 202 and for up to I connections $VC_{j,i}$, $0 \leq i \leq I$ and I an integer greater than 0 (shown as $VC_{j,1}$, $VC_{j,2}$, ..., $VC_{j,3}$ in FIG. 2), with a pointer HEAD (j) to the first connection $VC_{j,1}$ in the list and a pointer TAIL (j) to the last connection $VC_{j,1}$ in the list.

Scheduler 108 grants the next service to packets of a connection $VC_{j,i}$ by using a selector, shown in FIG. 2 as a smallest eligible virtual finishing time first (SEFF) selector 204, to provide the timestamp to, for example, controller 109 (FIG. 1) for the connection to be serviced. When a connection becomes backlogged, the connection is queued at the back (tail) of the corresponding rate queue j by setting the pointer TAIL (j). When a rate queue j is selected for (i.e., "granted") service by the SEFF selector 204, the connection that is currently pointed to at the front (head) of the queue by the pointer HEAD (j) is dequeued. In addition, if the connection dequeued is still backlogged, then the connection is queued at the tail of the rate queue j by setting the pointer TAIL (j).

SEFF selector 204 identifies the next connection for service as the connection $VC_{j,i}$ having the minimum corresponding rate queue timestamp among those connections in rate queues having timestamps satisfying an eligibility condition. The exemplary embodiment of the present invention includes a multi-bit value timestamp $F_j$ per rate queue j (referred to as the queue timestamp), one bit $bQ_j$ (referred to as the queue bit) per rate queue j, and a single bit $bVC_{j,i}$ (referred to as the connection bit) for the ith connection $VC_{j,i}$ in rate queue j. At timeslot m, the SEFF selector 204 searches the queue timestamps of the N rate queues for the queue timestamp having the minimum value $F_{S(m)}$ that (i) is associated with currently backlogged rate queues (a FIFO rate queue j is backlogged when the list has at least one connection in the rate queue for which packets are available) and (ii) satisfies a predetermined criterion according to the SEFF packet selection policy (known as the eligibility condition for SEFF) given in equation (1a):

$$F_{S(m)} = \min_{1 \leq j \leq N} \left\{ F_j s.t. F_j \leq P(m) + \frac{1}{r_j} \right\} \quad (1a)$$

where P(m) is the system potential. As is known in the art, other selection criteria may be employed. For example, in "smallest virtual finishing time first" (SFF) the predetermined criterion may be as given in equation (1b):

$$F_{S(m)} = \min_{1 \leq j \leq N} \{F_j\} \quad (1b)$$

and for "smallest virtual starting time first" (SSF) the predetermined criterion may be as given in equation (1c):

$$F_{S(m)} = \min_{1 \leq j \leq N} \left\{ F_j - \frac{1}{r_j} \right\} \quad (1c)$$

The function P(m) is, as is known in the art, the system potential that is updated for each timeslot m and is defined according to the particular scheduling method. For example, for Starting Potential Fair Queuing (SPFQ), the system potential may be as given in equation (2):

$$P(m) = \max\left\{ P(m-1) + \frac{1}{r}, \min_{j \in B(m)} \left( F_j - \frac{1}{r_j} \right) \right\} \quad (2)$$

where B(m) is the set of rate queues that are backlogged at the beginning of timeslot m; and r is the service rate of the server (e.g., server 102).

Figure 3:
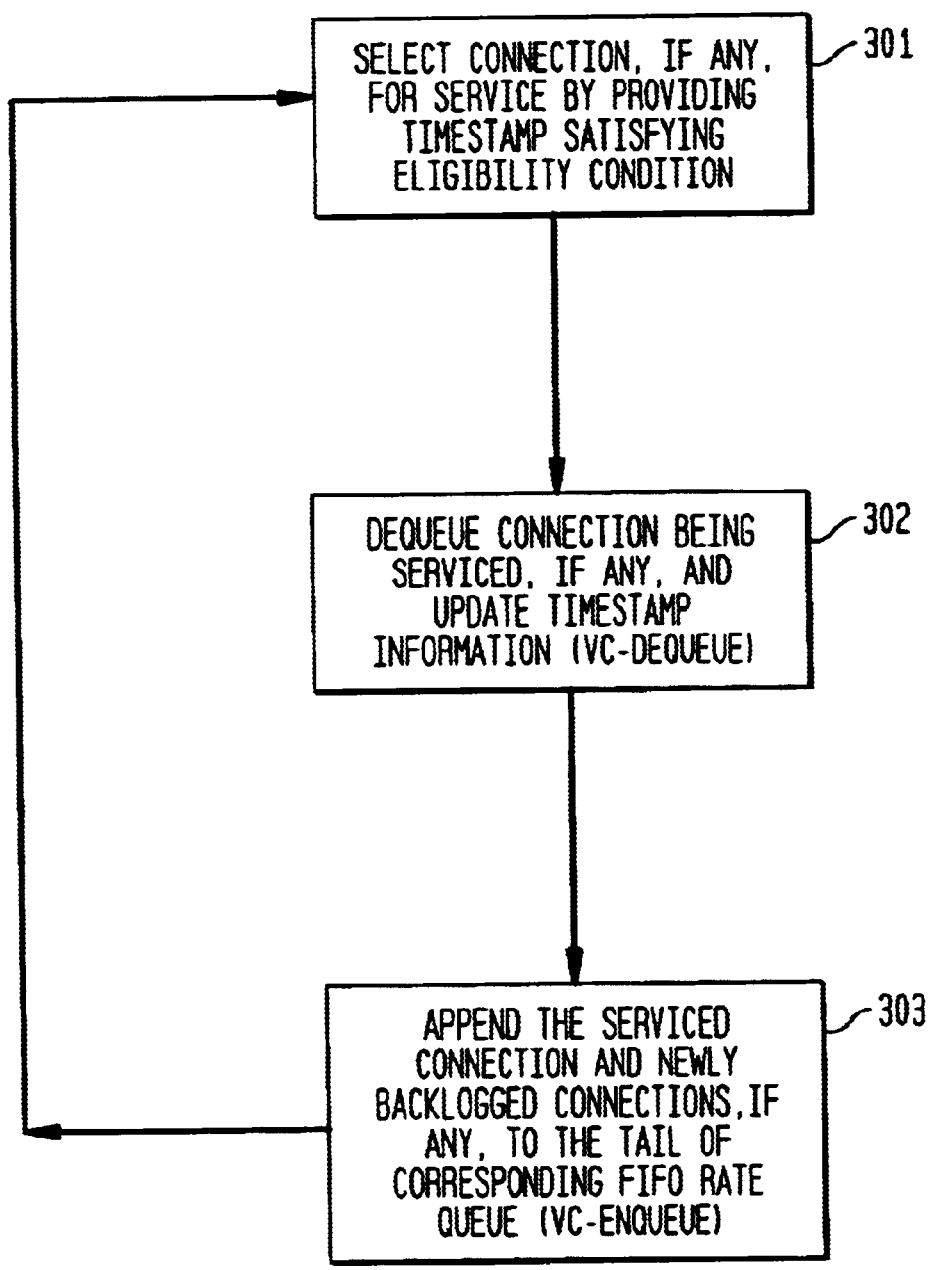
FIG. 3 shows an exemplary implementation of the method of selecting the next connection for service used by the scheduler of FIG. 2.

The steps employed by scheduler 108 to generate and set the queue timestamps $F_j$, the queue bits $bQ_j$, and the connection bits $bVC_{j,i}$ are now described. FIG. 3 shows an exemplary implementation of the single-bit-timestamp discrete-rate scheduling method for selecting the next service by the scheduler of FIG. 2. At step 301, during a timeslot m, the scheduler (e.g., implemented by server 102) selects the connection for service, if any, and the timestamp of the corresponding FIFO rate queue is provided. At step 302, the scheduler dequeues the connection being serviced, if any, from the corresponding (FIFO) rate queue, and updates rate queue and timestamp information (defined herein as the VC-dequeue operation). At step 303, the scheduler appends the serviced connection and/or newly backlogged connections to the tails of the respective rate FIFO queues, and updates rate queue and timestamp information (defined herein as the VC-enqueue operation). The scheduler then returns to step 301 from step 303 for the next service (in the next timeslot m+1). The implementation of FIG. 3 is exemplary only; as would be apparent to one skilled in the art, the method similarly operates where the order of execution of the VC-dequeue and VC-enqueue steps 302 and 303 is reversed.

FIG. 4 shows an exemplary implementation of VC-dequeue step 302 and VC-enqueue step 303 for the method of FIG. 3. For the VC-dequeue step 302, at step 401 the scheduler dequeues the connection serviced, if any, from the corresponding (FIFO) rate queue. After step 401, the FIFO rate queue of the dequeued connection may either become empty (case 1) or remain backlogged (case 2). At step 402, the scheduler tests whether case 1 or case 2 for the system applies. If case 1 applies, the serviced FIFO rate queue j becomes empty after the connection is dequeued, and if case 2 applies, the serviced FIFO rate queue j remains backlogged after the connection is dequeued.

If case 1 applies, the rate queue timestamp $F_j$ and the queue bit $bQ_j$ for the rate queue j remain unchanged and the method proceeds to step 303. If case 2 applies, a new connection $VC_{j,i'}$ is available at the head of the same rate queue and the method proceeds to step 403.

At step 403 the scheduler retrieves the connection bit $bVC_{j,i'}$ of connection $VC_{j,i'}$ and compares its value with the current value of the queue bit $bQ_j$. At step 404, a new value for the queue timestamp $F_j^m$ of the serviced rate queue j is set based on the comparison of step 403 as follows in equation (3):

$$F_j^m = \begin{cases} F_j^{m-1} & \text{if } bVC_{j,i'} = bQ_j \\ F_j^{m-1} + \dfrac{1}{r_j} & \text{if } bVC_{j,i'} \neq bQ_j \end{cases} \quad (3)$$

At step 405, if $bVC_{j,i'} \neq bQ_j$, the scheduler updates the queue bit as given by equation (4):

$$bQ_j = bVC_{j,i'} \quad (4)$$

and then proceeds to the VC-enqueue step 303.

For the VC enqueue step 303, the scheduler appends the serviced connection that remains backlogged, and/or newly backlogged connections, to the tails of the respective FIFO rate queues at step 406. After step 406, the connection $VC_{j,i}$ being queued may either find no other connection ahead of itself in the destination queue, or find at least one such connection. At step 407, the scheduler tests whether case 3 or case 4 for the system applies. If case 3 applies, then the destination FIFO rate queue j is empty when the connection $VC_{j,i}$ is enqueued at timeslot m, and if case 4 applies, the destination FIFO rate queue j is already backlogged when the connection $VC_{j,i}$ is queued at timeslot m.

If case 3 applies, at step 408 the new queue timestamp $F_j^m$ is computed for the serviced FIFO rate queue j according to equation (5):

$$F_j^m = \max(F_j^{m-1}, P(m)) + \dfrac{1}{r_j} \quad (5)$$

and the connection bit $bVC_{j,i}$ is set to the current value of the queue bit $bQ_j$ as in equation (6):

$$bVC_{j,i} = bQ_j \quad (6)$$

If case 4 applies, at step 409, the timestamp $F_j$ and the queue bit $bQ_j$ of rate queue j remain unchanged, and the value of the connection bit $bVC_{j,i}$ of connection $VC_{j,i}$ is set, according to equation (7):

$$bVC_{j,i} = \begin{cases} bQ_j & \text{if } F_j^m \geq P(m) + \dfrac{1}{r_j} \\ \overline{bQ_j} & \text{if } F_j^m < P(m) + \dfrac{1}{r_j} \end{cases} \quad (7)$$

where $\overline{bQ_j}$ is complement the queue bit $bQ_j$. After either step 408 or 409 is executed, the method then returns to step 301 (FIG. 3).

FIGS. 5A–5D are portions of a flow-chart of a method of scheduling transmission of packets for connections according to an exemplary implementation of the present invention. In FIGS. 5A–5D, the acronym "RQ" stands for "Rate Queue", and the term "data packet" may refer to a packet of a connection, a group of packets for a connection, an ATM cell or cells of a VC, or similar form of packetized data of a user's connection. The portion of the method shown in FIG. 5A and part of FIG. 5B may correspond to identifying a connection and assigning the connection to a rate queue (including connection and queue bits) for a data packet received at a server. The remainder of FIG. 5B and FIG. 5C may generally correspond to the selection and VC-dequeue operations, and FIG. 5D may generally correspond to the VC-enqueue operation.

Figure 5A:
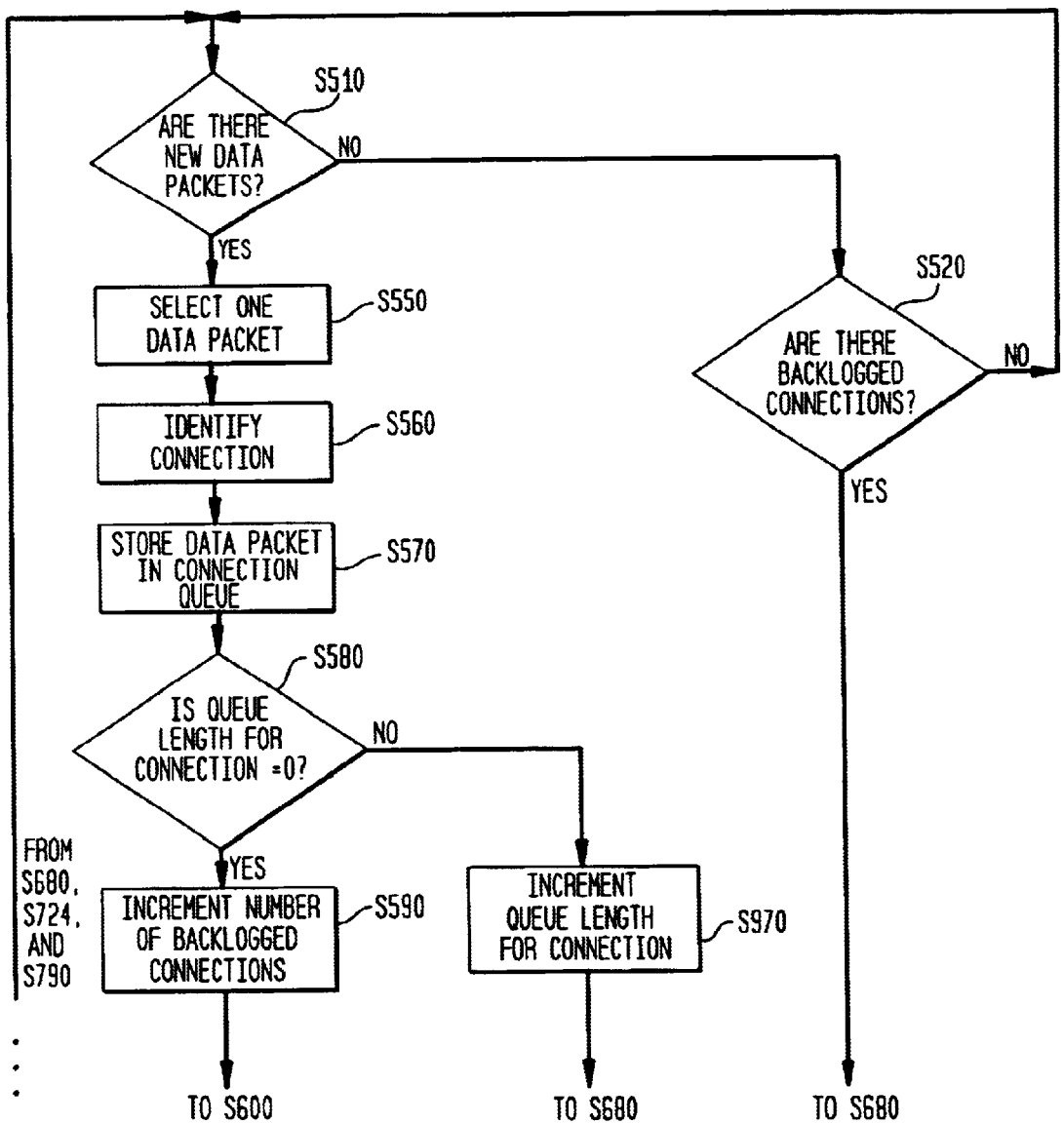
FIGS. 5A–5D show a flowchart of an algorithm for scheduling service and transmission of packets using single-bit-timestamp discrete-rate scheduling in accordance with an exemplary implementation of the present invention.

Referring to FIG. 5A, at step S510, the method tests whether new data packets are present at, for example, queue 107 of server 102 (FIG. 1). If step S510 detects that no new packets have been received, the method advances to step S520. At step S520, a test determines whether connections in the rate queues are backlogged. If the test of step S520 determines that no backlogged connections exist, the method returns to step S510. If step S520 determines that backlogged connections exist in one or more of the rate queues, then the method advances to step S680 (described subsequently with respect to FIG. 5C).

If the test at step S510 determines that new data packets are present, the method advances to step S550 to select a data packet from the queue. At step S560, the connection associated with the packet selected at step S550 is identified, and the method advances to step S570 to store the data packet in a connection queue. At step S580, a test determines whether a queue length for the connection is zero, which indicates that the connection of the packet is newly backlogged. If the step S580 determines that the queue length for the connection is not zero, then the connection is not backlogged and step S970 increments the queue length for the connection identified at step S560. The method then advances to step S680 (described subsequently with respect to FIG. 5C). If, at step S580, the queue length connection is equal to zero, then the connection identified in step S560 is newly backlogged. The method increments the number of backlogged connections at step S590 and advances to step S600 (described subsequently with respect to FIG. 5B).

Figure 5B:
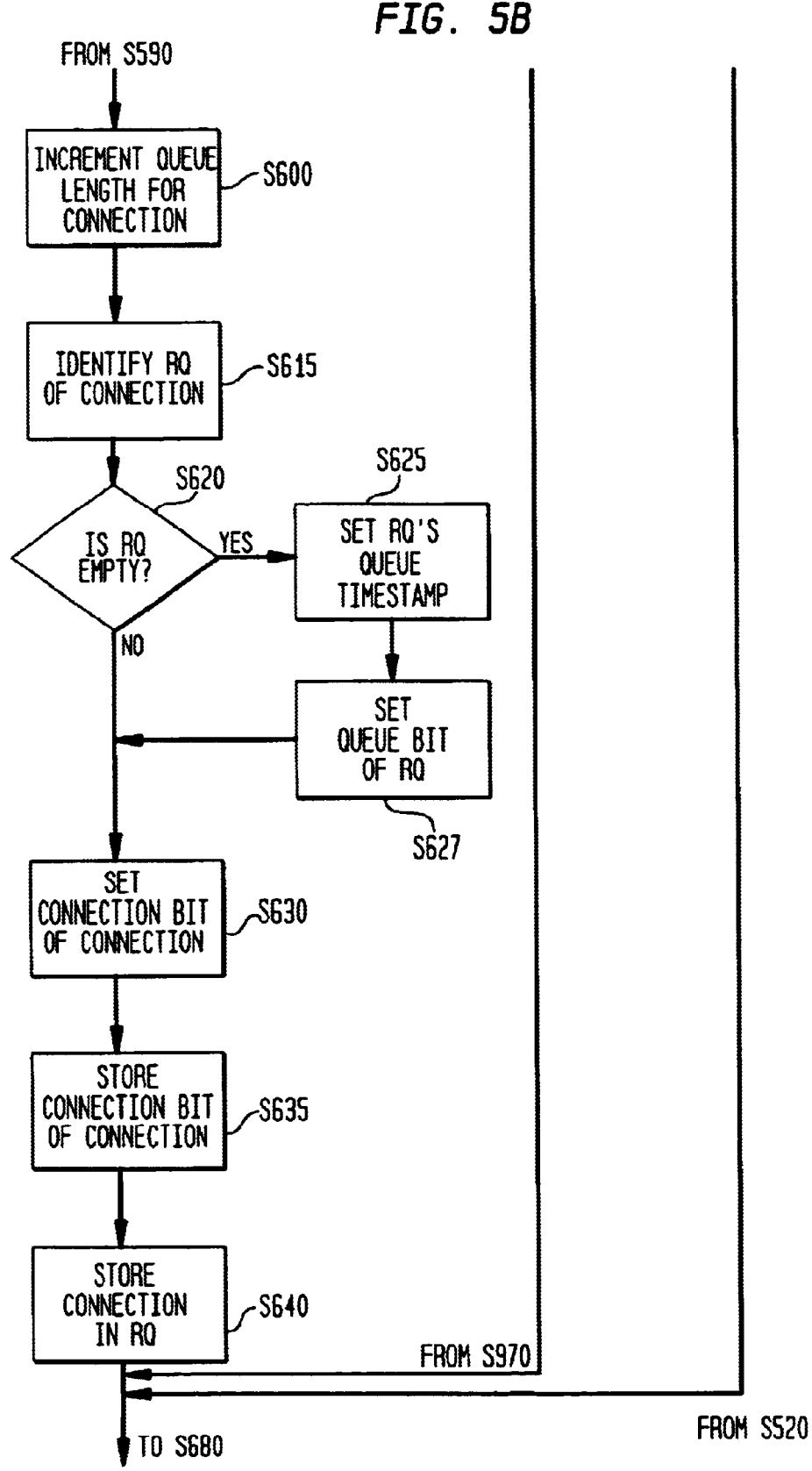

Referring to FIG. 5B, at step S600, the queue length for the connection is incremented. At step S615, the rate queue for the connection is identified, and, at step S620, a test determines whether the rate queue identified in step S615 is empty. If the rate queue identified at step S620 is empty, then: 1) the queue timestamp of the rate queue is set at step S625, and 2) the queue bit of the rate queue is set at step S627. After step S627, or if the test at step S620 determines that the rate queue is not empty, the method advances to step S630 to set the connection bit for the connection in the rate queue. At step S635, the connection bit set in step S630 is stored, and, at step S640, the connection is stored in the rate queue identified in step S615. Once the connection is stored at step S640, the method then advances to step S680 (FIG. 5C).

Figure 5C:
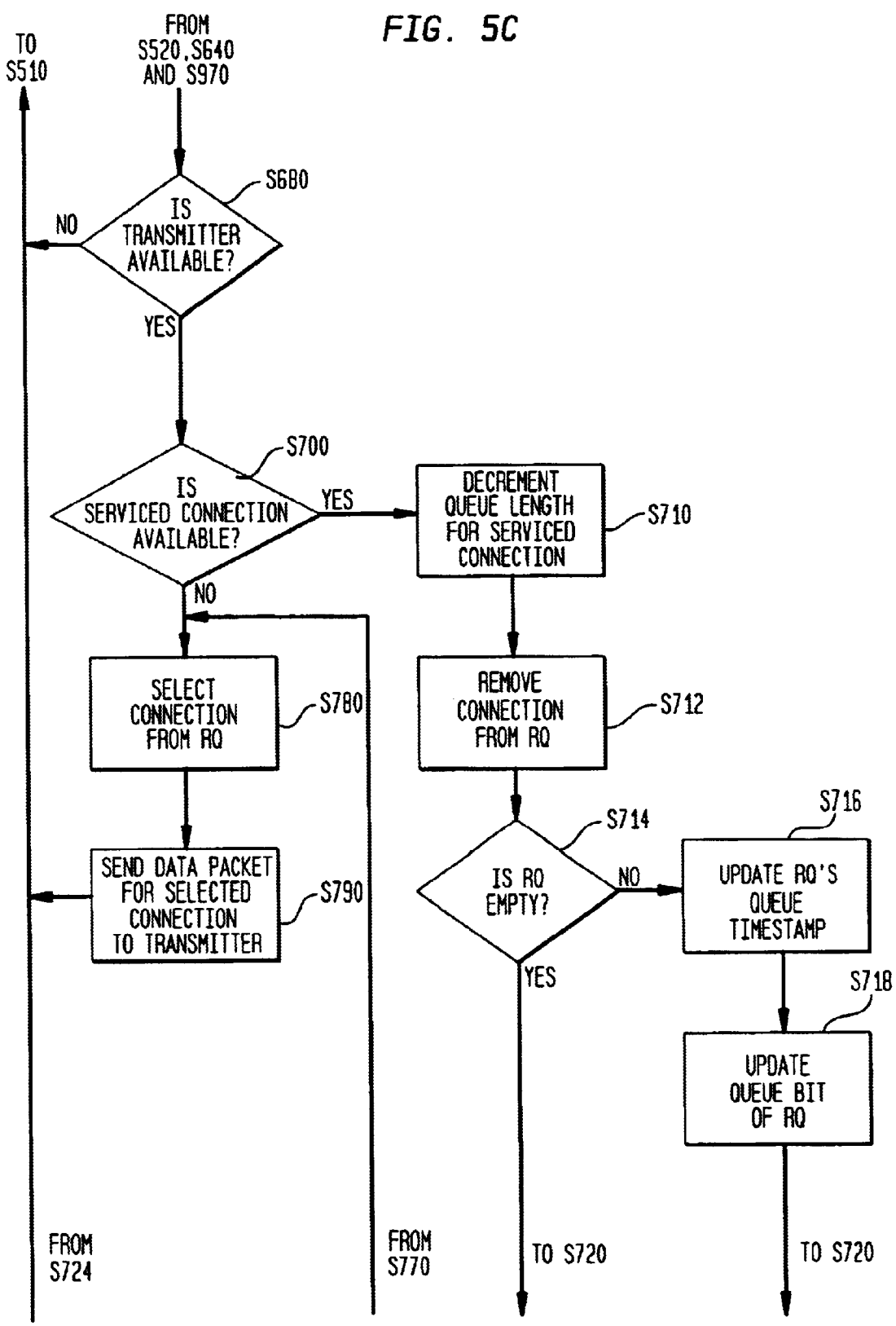

Referring to FIG. 5C, at step S680, a test determines whether a transmitter (i.e., output port, transmission capacity, or other resource in the server) is available for a connection to be serviced. If the test of step S680 determines that no transmitter is available, the method returns to step S510 (FIG. 5A). If the test of step S680 determines that a transmitter is available, the method advances to step S700 to test whether a just serviced connection is waiting for post-service processing. If the serviced connection is not available in step S700, the method advances to step S780 to select a connection from one of the rate queues to service. At step S790, the data packet associated with the connection selected in step S780 is serviced and sent to the transmitter. After step S790, the method returns to step S510 (FIG. 5A).

If the test of step S700 determines that a serviced connection is available for post-service processing, the method advances to step S710 to decrement the queue length for the connection serviced. At step S712, the connection is removed from the rate queue, and, at step S714, a test determines whether the rate queue is empty. If the test of step S714 determines that the rate queue is not empty, the method advances to step S716 to update the queue timestamp of the rate queue. At step S718, the queue bit of the rate queue is updated. If the test of step S714 determines the rate queue is empty, or after the queue bit of the rate queue is updated at step S718, the method advances to step S720 (FIG. 5D).

Figure 5D:
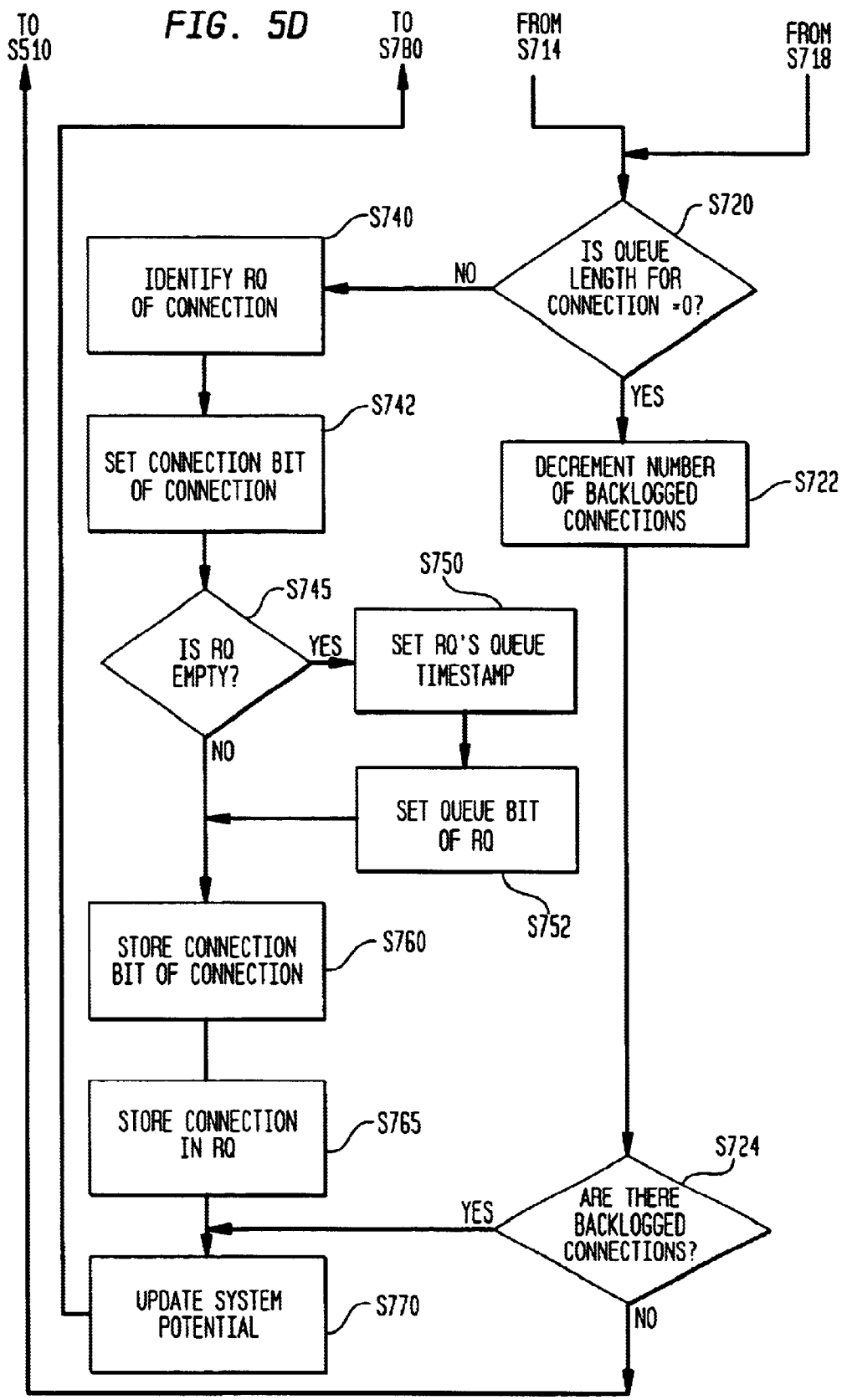

Referring to FIG. 5D, at step S720 a test determines whether the queue length for the serviced connection is zero. If the test of step S720 determines that the queue length for the connection is zero, at step S722, the number of backlogged connections is decremented and the method advances to step S724. At step S724, a test determines if one or more connections are backlogged. If the test of step S724 determines that one or more connections are backlogged, at step S770, the system potential is updated and the method returns to step S780 (FIG. 5C). If the test at step S724 determines that no connections are backlogged, then the method returns to step S510 (FIG. 5A).

If the test of step S720 determines that the queue length for the connection is not zero, then, at step S740, a rate queue is identified for the connection. At step S742, the connection bit of the connection is set. At step S745 a test is made to determine if the rate queue is empty, and if empty, at step S750 the queue timestamp of the rate queue is set. At step S752, the queue bit of the rate queue is set. If the test of step S745 determines the rate queue is not empty, or the queue bit of the rate queue is set at step S752, the method advances to step S760. At step S760 the connection bit of the connection is stored, and, at step S765, the corresponding connection is stored in the rate queue. After step S765, the method updates the system potential at step S770 and then returns to step S780 (FIG. 5C).

The delay bounds and fairness indices (both service fairness index (SFI) and worst case fairness index (WFI)) of a scheduler employing the single-bit-timestamp discrete-rate scheduling method are generally equivalent to the delay bounds and fairness indices of the discrete-rate scheduler of the prior art with per-connection timestamps. Therefore, the worst-case delay $D_i$ experienced by a $(b_i, r_i, p_i)$-leaky-bucket-constrained connection i (where $b_i$ is the bucket depth, $r_i$ is the average rate, and $p_i$ is the peak rate of the connection i) is bounded as in equation (8):

$$D_i < \frac{b_i + 2}{r_i} \quad (8)$$

The SFI, for two connections i and j having reserved services rates $r_i$ and $r_j$, is bounded as in equation (9):

$$SFI_{j,i} \leq \max\left(\frac{2}{r_i} + \frac{1}{r_j}, \frac{2}{r_j} + \frac{1}{r_i}\right) \quad (9)$$

The single-bit-timestamp discrete-rate scheduling method is worst-case fair (C-WFI=1 cell). At any time, a timestamp $\tilde{A}_{j,i}$ may be considered as being virtually associated with a connection $VC_{j,i}$. The virtual timestamp for the connection queued in rate queue j may be determined as in equation (10):

$$\text{If } bVC_{j,i} == bQ_j, \text{ then } \tilde{F}_{j,i} = F_j, \text{ else } \tilde{F}_{j,i} = F_j + 1/r_j \quad (10)$$

As shown above in equations (8) through (9), single-bit-timestamp discrete-rate scheduling method described herein conserves the near-optimal delay and fairness properties of the discrete-rate scheduler with per-connection timestamps. The combination of the connection bit $bVC_{j,i}$, and queue timestamp $F_j$ associated with each backlogged connection $VC_{j,i}$ satisfying the same set of conditions and bounds as the corresponding timestamp of the scheduler with per-connection timestamps (even if represented by a different value). Therefore, the delay bounds and fairness indices of the two schedulers are identical.

Single-bit-timestamp discrete-rate scheduling may achieve the delay bounds and fairness indices of the discrete-rate scheduling using timestamps for each connection. Single-bit timestamp discrete-rate scheduling reduces the implementation cost of Generalized Processor Sharing (GPS) worst-case-fair schedulers in ATM systems while maintaining near-optimal performance. The single-bit-timestamp discrete-rate scheduling uses only a single bit per connection, allowing for reduced implementation cost while achieving delay bounds and fairness indices that are identical to the ones of the discrete-rate scheduler using per-connection timestamps.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the scope of the invention as expressed in the following claims.

What is claimed is:

1. A method of selecting one of a plurality of connections of a server in a packet network for service of one or more packets of the connection, the method comprising the steps of:

(a) selecting a connection for service, if any, at a head of a rate queue based on the queue timestamp satisfying a predetermined criterion;

wherein each connection is assigned to a rate queue based on a service rate of the connection, each rate queue having a corresponding multi-bit queue timestamp based on a system potential and a corresponding queue bit, and each connection is assigned a corresponding connection bit in the rate queue;

(b) dequeuing the connection by i) removing the connection selected in step (a) from the corresponding rate queue, and by ii) updating at least one of the corresponding queue timestamp, queue bit, and connection bit of the connection, wherein the queue timestamp is updated based on a comparison of the corresponding queue bit and connection bit; and (c) enqueuing the connection by i) appending the connection selected in step (a), if backlogged, to the tail of the corresponding rate queue, and ii) updating at least one of the corresponding queue timestamp, queue bit, and connection bit of the connection.

2. The invention of claim 1, wherein the method implements steps (a), (b), and (c) during a timeslot, and the method further comprises the step of (d) repeating steps (a), (b), and (c) for each subsequent timeslot.

3. The invention of claim 1, wherein step (a) includes the step of determining if one or more new connections are received by the server, and step (c) further includes the step of iii) appending newly backlogged connections, if any, to the tails of the corresponding rate queues.

4. The invention of claim 1, wherein the one or more packets are one or more cells in accordance with an asynchronous transfer mode packet network and the method implements steps (a), (b), and (c) to select the one or more cells.

5. The invention of claim 1, wherein step (b) comprises the steps of:
(1) testing, after the connection is removed, whether the corresponding rate queue is empty;
(2) if the rate queue is empty, then:
(i) maintaining the corresponding rate queue timestamp and the queue bit for the rate queue as unchanged, and
if the rate queue is not empty, a new connection is available at the head of the rate queue, then:
(ii) comparing the connection bit of the new connection $VC_{j,i}$ to the current value of the queue bit; and
(iii) setting a new value for the queue timestamp $F_j^m$ during a timeslot m based on the comparison of step (ii) as:

$$F_j^m = \begin{cases} F_j^{m-1} & \text{if } bVC_{j,i'} == bQ_j \\ F_j^{m-1} + \frac{1}{r_j} & \text{if } bVC_{j,i'} \neq bQ_j \end{cases}$$

where $F_j^{m-1}$ is the current queue timestamp at the beginning of timeslot m and $r_j$ is the service rate of the rate queue; and (3) if the connection bit of the new connection is not equivalent to the queue bit of the rate queue, then:
(i) setting the queue bit of the rate queue as the connection bit of the new connection.

6. The invention of claim 1, wherein step (c) comprises the steps of:
(1) testing for each connection appended whether a destination rate queue, defined as the destination rate queue j, for the connection is empty;
(2) if the destination rate queue j is empty, then:
(i) computing a new queue timestamp $F_j^m$ during a timeslot m for the destination rate queue j as:

$$F_j^m = \max(F_j^{m-1}, P(m)) + \frac{1}{r_j}$$

where $F_j^{m-1}$ is a current queue timestamp at the beginning of timeslot m, $r_j$ is a service rate for the destination rate queue j, and P(m) is a value for the system potential at the beginning of timeslot m, and (ii) setting the connection bit of the connection to the current value of the queue bit; and (3) if the destination rate queue j is not empty then:
(i) maintaining the queue timestamp $F_j^m$ and the queue bit of the destination rate queue as unchanged; and
(ii) setting the connection bit $bVC_j$ of the connection as:

$$bVC_j = \begin{cases} bQ_j & \text{if } F_j^m \geq P(m) + \frac{1}{r_j} \\ \overline{bQ_j} & \text{if } F_j^m < P(m) + \frac{1}{r_j} \end{cases}$$

where $\overline{bQ_j}$ is the complement of the queue bit $bQ_j$.

7. The invention of claim 1, wherein, for step (a), the predetermined criterion is either smallest eligible virtual finishing time first, smallest virtual finishing time first, or smallest virtual starting time first.

8. A scheduler for selecting one of a plurality of connections of a server in a packet network for service of one or more packets of the connection, the scheduler comprising:
a selection module configured to select a connection for service, if any, at a head of a rate queue based on the queue timestamp satisfying a predetermined criterion;
wherein each connection is assigned to one of a plurality of rate queues based on a service rate of the connection, each rate queue having a corresponding multi-bit queue timestamp based on a system potential and a corresponding queue bit, and each connection is assigned a corresponding connection bit in the rate queue;
a dequeue module configured to update the connection by i) removing the connection selected in step (a) from the corresponding rate queue, and by ii) updating at least one of the corresponding queue timestamp, queue bit, and connection bit of the connection, wherein the queue timestamp is updated based on a comparison of the corresponding queue bit and connection bit; and
an enqueue module configured to update the connection by i) appending the connection selected in step (a), if backlogged, to the tail of the corresponding rate queue, and ii) updating at least one of the corresponding queue timestamp, queue bit, and connection bit of the connection.

9. The invention of claim 8, wherein the apparatus sequentially selects each connection at a head of a corresponding rate queue satisfying the predetermined criterion for each subsequent timeslot.

10. The invention of claim 8, wherein the selection module is further configured to determine if one or more new connections are received by the server, and the enqueu module is further configured to append newly backlogged connections, if any, to the tails of the corresponding rate queues.

11. The invention of claim 8, wherein the one or more packets are one or more cells in accordance with an asynchronous transfer mode packet network and the apparatus selects the one or more cells for processing when the connection is selected.

12. The invention of claim 8, wherein dequeue module updates the connection by:
(1) testing, after the connection is removed, whether the corresponding rate queue is empty;
(2) if the rate queue is empty, then:
(i) maintaining the corresponding rate queue timestamp and the queue bit for the rate queue as unchanged, and
(3) if the rate queue is not empty a new connection $VC_{j,i}$ is available at the head of the rate queue, then:

(ii) comparing the connection bit of the new connection to the current value of the queue bit; and
(iii) setting a new value for the queue timestamp $F_j^m$ during a timeslot m based on the comparison of step (ii) as:

$$F_j^m = \begin{cases} F_j^{m-1} & \text{if } bVC_{j,i} = bQ_j \\ F_j^{m-1} + \dfrac{1}{r_j} & \text{if } bVC_{j,i} \neq bQ_j \end{cases}$$

where $F_j^{m-1}$ is the current queue timestamp at the beginning of timeslot m and $r_j$ is the service rate of the rate queue; and (4) if the connection bit of the new connection is not equivalent to the queue bit of the rate queue, then:
(i) setting the queue bit of the rate queue as the connection bit of the new connection.

13. The invention of claim 8, wherein the enqueue module updates the connection by:

(1) testing for each connection appended whether a destination rate queue, defined as the destination rate queue j, for the connection is empty;
(2) if the destination rate queue j is empty, then:
(i) computing a new queue timestamp $F_j^m$ during a timeslot m for the destination rate queue j as:

$$F_j^m = \max(F_j^{m-1}, P(m)) + \frac{1}{r_j}$$

where $F_j^{m-1}$ is a current queue timestamp at the beginning of timeslot m, $r_j$ is a service rate for the destination rate queue j, and P(m) is a value if the system potential at timeslot m, and
(ii) setting the connection bit of the connection to the current value of the queue bit; and
(3) if the destination rate queue j is not empty then:
(i) maintaining the queue timestamp $F_j^m$ and the queue bit of the destination rate queue as unchanged; and
(ii) setting the connection bit $bVC_j$ of the connection as:

$$bVC_j = \begin{cases} bQ_j & \text{if } F_j^m \geq P(m) + \dfrac{1}{r_j} \\ \overline{bQ_j} & \text{if } F_j^m < P(m) + \dfrac{1}{r_j} \end{cases}$$

where $\overline{bQ_j}$ is the complement of the queue bit.

14. The invention of claim 8, wherein the predetermined criterion is either smallest eligible virtual finishing time first, smallest finishing time first, or smallest starting time first.

15. A computer-readable medium having stored thereon a plurality of instructions, the plurality of instructions including instructions which, when executed by a processor, cause the processor to implement a method of selecting one of a plurality of connections of a server in a packet network for service of one or more packets of the connection, the method comprising the steps of:

(a) selecting a connection for service, if any, at a head of a rate queue based on the queue timestamp satisfying a predetermined criterion;
wherein each connection is assigned to a rate queue based on a service rate of the connection, each rate queue having a corresponding multi-bit queue timestamp based on a system potential and a corresponding queue bit, and each connection is assigned a corresponding connection bit in the rate queue;
(b) dequeuing the connection by i) removing the connection selected in step (a) from the corresponding rate queue, and by ii) updating at least one of the corresponding queue timestamp, queue bit, and connection bit of the connection,
wherein the queue timestamp is updated based on a comparison of the corresponding queue bit and connection bit; and
(c) enqueuing the connection by i) appending the connection selected in step (a), if backlogged, to the tail of the corresponding rate queue, and ii) updating at least one of the corresponding queue timestamp, queue bit, and connection bit of the connection.

16. The invention of claim 15, wherein the method implements steps (a), (b), and (c) during a timeslot, and the method further comprises the step of (d) repeating steps (a), (b), and (c) for each subsequent timeslot.

17. The invention of claim 15, wherein step (a) includes the step of determining if one or more new connections are received by the server, and step (c) further includes the step of iii) appending newly backlogged connections, if any, to the tails of the corresponding rate queues.

18. A method of selecting one of a plurality of connections of a server in a packet network for service of one or more packets of the connection, the method comprising the steps of:

(a) selecting a connection for service, if any, at a head of a rate queue based on the queue timestamp satisfying a predetermined criterion;
wherein each connection is assigned to a rate queue based on a service rate of the connection, each rate queue having a corresponding multi-bit queue timestamp based on a system potential and a corresponding queue bit, and each connection is assigned a corresponding connection bit in the rate queue;
(b) dequeuing the connection by i) removing the connection selected in step (a) from the corresponding rate queue, and by ii) updating at least one of the corresponding queue timestamp, queue bit, and connection bit of the connection,
wherein step (b) comprises the steps of:
(1) testing, after the connection is removed, whether the corresponding rate queue is empty;
(2) if the rate queue is empty, then:
(i) maintaining the corresponding rate queue timestamp and the queue bit for the rate queue as unchanged, and
if the rate queue is not empty, a new connection is available at the head of the rate queue, then:
(ii) comparing the connection bit of the new connection $VC_{j,i}$ to the current value of the queue bit; and
(iii) setting a new value for the queue timestamp $F_j^m$ during a timeslot m based on the comparison of step (ii) as:

$$F_j^m = \begin{cases} F_j^{m-1} & \text{if } bVC_{j,i} = bQ_j \\ F_j^{m-1} + \dfrac{1}{r_j} & \text{if } bVC_{j,i} \neq bQ_j \end{cases}$$

where $F_j^{m-1}$ is the current queue timestamp at the beginning of timeslot m and $r_j$ is the service rate of the rate queue; and (3) if the connection bit of the new connection is not equivalent to the queue bit of the rate queue, then:
  (i) setting the queue bit of the rate queue as the connection bit of the new connection; and
(c) enqueuing the connection by i) appending the connection selected in step (a), if backlogged, to the tail of the corresponding rate queue, and ii) updating at least one of the corresponding queue timestamp, queue bit, and connection bit of the connection.

19. A method of selecting one of a plurality of connections of a server in a packet network for service of one or more packets of the connection, the method comprising the steps of:
  (a) selecting a connection for service, if any, at a head of a rate queue based on the queue timestamp satisfying a predetermined criterion;
  wherein each connection is assigned to a rate queue based on a service rate of the connection, each rate queue having a corresponding multi-bit queue timestamp based on a system potential and a corresponding queue bit, and each connection is assigned a corresponding connection bit in the rate queue;
  (b) dequeuing the connection by i) removing the connection selected in step (a) from the corresponding rate queue, and by ii) updating at least one of the corresponding queue timestamp, queue bit, and connection bit of the connection; and
  (c) enqueuing the connection by i) appending the connection selected in step (a), if backlogged, to the tail of the corresponding rate queue, and ii) updating at least one of the corresponding queue timestamp, queue bit, and connection bit of the connection,
  wherein step (c) comprises the steps of:
    (1) testing for each connection appended whether a destination rate queue, defined as the destination rate queue j, for the connection is empty;
    (2) if the destination rate queue j is empty, then:
      (i) computing a new queue timestamp $F_j^m$ during a timeslot m for the destination rate queue j as:

$$F_j^m = \max(F_j^{m-1}, P(m)) + \frac{1}{r_j}$$

where $F_j^{m-1}$ is a current queue timestamp at the beginning of timeslot m, $r_j$ is a service rate for the destination rate queue j, and P(m) is a value for the system potential at the beginning of timeslot m, and
      (ii) setting the connection bit of the connection to the current value of the queue bit; and
    (3) if the destination rate queue j is not empty then:
      (i) maintaining the queue timestamp $F_j^m$ and the queue bit of the destination rate queue as unchanged; and
      (ii) setting the connection bit $bVC_j$ of the connection as:

$$bVC_j = \begin{cases} bQ_j & \text{if } F_j^m \geq P(m) + \frac{1}{r_j} \\ \overline{bQ_j} & \text{if } F_j^m < P(m) + \frac{1}{r_j} \end{cases}$$

where $\overline{bQ_j}$ is the complement of the queue bit $bQ_j$.

20. A scheduler for selecting one of a plurality of connections of a server in a packet network for service of one or more packets of the connection, the scheduler comprising:

a selection module configured to select a connection for service, if any, at a head of a rate queue based on the queue timestamp satisfying a predetermined criterion;
wherein each connection is assigned to one of a plurality of rate queues based on a service rate of the connection, each rate queue having a corresponding multi-bit queue timestamp based on a system potential and a corresponding queue bit, and each connection is assigned a corresponding connection bit in the rate queue;
a dequeue module configured to update the connection by i) removing the connection selected in step (a) from the corresponding rate queue, and by ii) updating at least one of the corresponding queue timestamp, queue bit, and connection bit of the connection; and
an enqueue module configured to update the connection by i) appending the connection selected in step (a), if backlogged, to the tail of the corresponding rate queue, and ii) updating at least one of the corresponding queue timestamp, queue bit, and connection bit of the connection,
wherein the dequeue module updates the connection by:
  (1) testing, after the connection is removed, whether the corresponding rate queue is empty;
  (2) if the rate queue is empty, then:
    (i) maintaining the corresponding rate queue timestamp and the queue bit for the rate queue as unchanged, and
  (3) if the rate queue is not empty a new connection $VC_{j,i}$ is available at the head of the rate queue, then:
    (ii) comparing the connection bit of the new connection to the current value of the queue bit; and
    (iii) setting a new value for the queue timestamp $F_j^m$ during a timeslot m based on the comparison of step (ii) as:

$$F_j^m = \begin{cases} F_j^{m-1} & \text{if } bVC_{j,i} = bQ_j \\ F_j^{m-1} + \frac{1}{r_j} & \text{if } bVC_{j,i} \neq bQ_j \end{cases}$$

where $F_j^{m-1}$ is the current queue timestamp at the beginning of timeslot m and $r_j$ is the service rate of the rate queue; and
  (4) if the connection bit of the new connection is not equivalent to the queue bit of the rate queue, then:
    (i) setting the queue bit of the rate queue as the connection bit of the new connection.

21. A scheduler for selecting one of a plurality of connections of a server in a packet network for service of one or more packets of the connection, the scheduler comprising:

a selection module configured to select a connection for service, if any, at a head of a rate queue based on the queue timestamp satisfying a predetermined criterion;
wherein each connection is assigned to one of a plurality of rate queues based on a service rate of the connection, each rate queue having a corresponding multi-bit queue timestamp based on a system potential and a corresponding queue bit, and each connection is assigned a corresponding connection bit in the rate queue;
a dequeue module configured to update the connection by i) removing the connection selected in step (a) from the corresponding rate queue, and by ii) updating at least one of the corresponding queue timestamp, queue bit, and connection bit of the connection; and
an enqueue module configured to update the connection by i) appending the connection selected in step (a), if backlogged, to the tail of the corresponding rate queue, and ii) updating at least one of the corresponding queue timestamp, queue bit, and connection bit of the connection, wherein the enqueue module updates the connection by:

(1) testing for each connection appended whether a destination rate queue, defined as the destination rate queue j, for the connection is empty;

(2) if the destination rate queue j is empty, then:

(i) computing a new queue timestamp $F_j^m$ during a timeslot m for the destination rate queue j as:

$$F_j^m = \max(F_j^{m-1}, P(m)) + \frac{1}{r_j}$$

where $F_j^{m-1}$ is a current queue timestamp at the beginning of timeslot m, $r_j$ is a service rate for the destination rate queue j, and P(m) is a value if the system potential at timeslot m, and (ii) setting the connection bit of the connection to the current value of the queue bit; and (3) if the destination rate queue j is not empty then:

(i) maintaining the queue timestamp $F_j^m$ and the queue bit of the destination rate queue as unchanged; and (ii) setting the connection bit $bVC_j$ of the connection as:

$$bVC_j = \begin{cases} bQ_j & \text{if } F_j^m \geq P(m) + \frac{1}{r_j} \\ \overline{bQ_j} & \text{if } F_j^m < P(m) + \frac{1}{r_j} \end{cases}$$

where $\overline{bQ_j}$ is the complement of the queue bit.

* * * * *

UNITED STATES PATENT AND TRADEMARK OFFICE
CERTIFICATE OF CORRECTION

PATENT NO.   : 6,654,345 B1
DATED        : November 25, 2003
INVENTOR(S)  : Fabio M. Chiussi and Andrea Francini It is certified that error appears in the above-identified patent and that said Letters Patent is hereby corrected as shown below:

<u>Column 12,</u>
Line 49, replace "and the enqueu" with -- and the enqueue --.

Signed and Sealed this

Twentieth Day of January, 2004

JON W. DUDAS
*Acting Director of the United States Patent and Trademark Office*